United States Patent Office 2,865,765
Patented Dec. 23, 1958

2,865,765

PROCESS OF PRESERVING FRESH PRODUCE IN ORIENTED FILM

Albert S. Allen, Ridley Park, Pa., assignor to E. I. du Pont de Nemours and Company, Wilmington, Del., a corporation of Delaware No Drawing. Application December 29, 1954
Serial No. 478,540

5 Claims. (Cl. 99—154)

This invention relates to a process of packaging fresh produce, and more particularly, to a process of packaging fresh produce in oriented, polyethylene terephthalate film and freezing the produce in the film.

Oriented polyethylene terephthalate film is a versatile packaging material which posseses a unique combination of outstanding balanced physical properties, resistance to attack by many chemicals, and excellent dimensional stability at elevated temperatures. The film may be employed as a packaging material in its oriented state (stretched and/or rolled in two directions and heat-set, i. e., subjected to elevated temperatures of from 150°–250° C. while restricting dimensional change), and in this form it is substantially dimensionally stable at temperatures up to the heat-setting temperature. On the other hand, the film may be employed as a heat-shrinkable packaging material, and in this form the film will shrink when subjected to temperatures of at least about 70°–80° C. in the direction(s) in which it has been stretched and/or rolled. To prepare a heat-shrinkable film the heat-setting step is omitted in preparing the oriented film.

In process for packaging and quick freezing of fresh produce, i. e., fresh fruits and vegetables, the produce is picked in the fields, rapidly conveyed to a husking, hulling or washing station where it is cleaned and washed under conditions of cooling temperatures, e. g., washed in cool water; and thereafter the produce is blanched, i. e., subjected to hot water or steam or general conditions of elevated temperature for a short duration, and finally cooled, packaged and frozen in packaged form. The preliminary packaging, usually prior to freezing, is carried out by inserting the cooled produce into a bag or envelope of a material acting as a liquid barrier, e. g., a waxed paper, and thereafter the package is placed in a final container, e. g., a cardboard box, which is then overwrapped with a liquid and vapor barrier material such as moisture-proof cellophane or metal foil or a waxed paper.

In this process of preparing the fresh produce for freezing, the produce is normally subjected to blanching under conditions of direct contact with liquid water or water vapor in the form of steam. In the course of the blanching step the contact with liquid tends to extract valuable materials. Furthermore, the produce tends to absorb liquid water, the quantity absorbed depending upon the necessary time and conditions of blanching. Furthermore, when the frozen food is taken from the package and cooked prior to eating, the food is again subjected to conditions of elevated temperature and contact with liquid water during which time additional nutritious and flavorable ingredients are extracted from the food in addition to further absorption of liquid water into the food itself. In the final analysis the original flavor of the produce is appreciably reduced and the sensation of eating fresh fruits and vegetables is substantially lost. This is in addition to the loss of vitamin, mineral and sugar content of the freshly picked produce.

It is an object of the present invention to provide a produce packaging process which provides for preserving the nutritious and flavorable ingredients in freshly picked produce right up to the instant of eating. A further object of the present invention is to provide a unique packaging process which provides fresh produce in quantities sufficient for individual servings. Other objects of the present invention will be apparent from the following description.

The above objects are accomplished by providing a process of packaging fresh produce, i. e., fresh fruits and vegetables, comprising the steps of washing the produce, enclosing the produce in a wrapper, e. g., a bag fabricated from oriented polyethylene terephthalate film, blanching the produce in the wrapper, and thereafter cooling and freezing the produce in the wrapper.

While the present invention will be described hereinafter with respect to polyethylene terephthalate film, it is to be understood that the invention applies to the use of films of polymeric linear terephthalate esters formed by reacting a glycol of the series $HO(CH_2)_nOH$, wherein "$n$" is an integer from 2–10, inclusive, with terephthalic acid or a low alkyl ester thereof, e. g., dimethyl terephthalate. A glycol and an alkyl ester of terephthalic acid may be reacted under ester interchange conditions to form a monomeric ester which is subsequently condensed under conditions of elevated temperature and reduced pressure to form a polymeric linear terephthalate ester. These polyesters are readily formed into film by melt casting.

A polyethylene terephthalate film useful in the present packaging process is one which has been oriented and heat-set under conditions of elevated temperature and restrained shrinkage. For example, the polyethylene terephthalate film in substantially amorphous form may be oriented by stretching the film substantailly equally in both directions [in directions perpendicular to one another such as in the longitudinal direction or machine direction (MD) and in the transverse direction (TD)] to an extent usually at least above 2–2.5× (2–2.5 times the original dimensions of the film) and no more than about 3.25× in both directions. Heat-setting of the film is carried out after two-way stretching, and this is done while maintaining the film under tension, i. e., while restricting change in dimensions at a temperature above 100° C., and preferably within the range of 150°–250° C. The term "balanced" will be employed herein to apply to oriented film which has been stretched to substantially the same extent, e. g., 3× in both directions. That is, when the film is stretched to an equal extent in both directions, the film is considered to be substantially balanced, which means that the physical properties as measured in both directions are substantially equivalent. Stretching to a degree of about 3× in both directions provides for substantially optimum resistance to degradation by heat. Orientation of the film by stretching it to an extent of 3× in both directions further serves to impart substantially optimum physical properties to the film as shown in the following table:

TABLE I

*Polyethylene terephthalate film*

| Property | Stretched 3× Biaxially | Stretched 3× Biaxially | Stretched 3× Biaxially | Unstretched |
| --- | --- | --- | --- | --- |
| Thickness | 0.001 | 0.001 | 0.001 | 0.001 |
| Tensile (p. s. i.) | 26,000 | 19,500 | 16,000 | 8,000 |
| Break Elongation (percent) | 100 | 160 | 200 | [1] 450 |
| Impact (Kg.-cm.) | 75 | 63 | 46 | 1.5 |
| Tear Strength (g.) | 22 | 16 | 26 | 35 |
| Flex Life (cycles) | 20,000 | | | 10,000 |
| Water Vapor Permeability (g./100 sq. meters/hour) | 160 | | | 330 |
| Tensile Modulus (p. s. i.) | 500,000 | 450,000 | 470,000 | 300,000 |
| Density (g./cc.) | 1.4 | | | 1.34 |

[1] At slow elongation rate.

In preparing oriented film which is suitable as sheet wrapping material or for fabrication into flexible bags or relatively rigid containers for use in the present process it is usually necessary, unless a heat-shrinkable (non-heat-set) film is to be used, that the film be balanced. Besides stretching the film in both directions, it should be emphasized that orientation may be carried out by stretching the film in one direction such as the longitudinal direction, and thereafter rolling the film down to reduce its thickness and elongate it in the transverse direction; or the film may be oriented by rolling the film in both directions. When speaking of a stretched film, a balanced film is one which has been stretched to about the same extent in both directions, e. g., 3× biaxially. This is assuming that the dimension of the film not being extended is held substantially constant while the other dimension is being extended. Except for the margin of error encountered in measuring certain physical properties, the physical properties of a balanced film are substantially the same in both directions. This may be determined by calculating the dichroic ratio (ratio of infrared absorbence for direction of polarized light vibration parallel and perpendicular, respectively, to the machine direction of the film). A fully balanced film has a dichroic ratio of 1.00. For example, a one-way stretched film stretched 3× in the MD exhibits a dichroic ratio of about 2.93. On the other hand, a sample of biaxially stretched (3× in both directions) polyethylene terephthalate film which had been heat-set while held under tension to restrict the dimensions thereof exhibited a dichroic ratio of 1.17, showing the close approach to a fully balanced sheet. In describing the present invention, however, a balanced film is one which has been stretched to substantially the same extent in both directions, has a dichroic ratio approaching unity, and has substantially the same physical properties as measured in both the longitudinal and transverse directions. On the other hand, a film which has been oriented in both directions by rolling the film between compressive forces, e. g., calender rolls, may also be considered a balanced film if the resulting physical properties are substantially the same as measured in both directions and the dichroic ratio approaches unity. Furthermore, it is quite possible to obtain a balanced film by stretching the film in one direction and rolling it in a direction perpendicular to the first direction.

The following table illustrates the resultant physical properties of a balanced film formed by stretching to the same extent in both directions.

TABLE II

| Property | Poly. Tere. Film (Stretched 3× Biaxially and heat-set at 150° C.) | | Poly. Tere. Film (Stretched 3× Biaxially and heat-set at 150° C.) | |
| --- | --- | --- | --- | --- |
| | MD | TD | MD | TD |
| Thickness (inches) | 0.0005 | | 0.001 | |
| Impact Strength (p. s. i.) | 30 | | 75 | |
| Tear Strength (grams) | 15 | 15 | 22 | 22 |
| Tensile Strength (p. s. i.) | 28,000 | | 28,000 | 24,000 |
| Elongation, Percent (100%/min.) | 100 | | 100 | 100 |
| Tensile Modulus (p. s. i.) | 520,000 | | 520,000 | 480,000 |
| Bending Modulus (p. s. i.) | | | 500,000 | |
| Vibration Modulus (p. s. i.) | 325,000 | | 325,000 | |
| Flex Life (cycles) | 40,000 | | 20,000 | |
| Density | 1.40 | | 1.40 | |

Since the present invention provides a suitable packaging film wherein fresh produce may be blanched, cooled, frozen and subsequently cooked for eating, it is important to note the negligible effect of boiling water upon oriented, balanced, heat-set polyethylene terephthalate film for different durations of time. Table III illustrates the resulting tensile strength, elongation, tear strength, and impact strength of various film samples after immersion in boiling water for 5 hours, 48 hours, and 7 days, respectively.

TABLE III

*Effect of heat and water on polyethylene terephthalate film [1]*

| Temperature | Time | Tensile Strength, p. s. i. | | Elongation, Percent | | Tear, g./0.001″ | | Impact, Kg.-cm./0.001″ |
| --- | --- | --- | --- | --- | --- | --- | --- | --- |
| | | MD | TD | MD | TD | MD | TD | |
| 100° C. water | 5 hours | 19,700 | 21,000 | 126 | 171 | 30 | 29 | 40 |
| Do | 48 hours | 18,700 | 19,100 | 120 | 80 | 18 | 23 | 59 |
| Do | 7 days | 17,600 | 16,700 | 136 | 110 | 10 | 11 | 25 |
| Room—NaCl soln. (sat.) | 33 days | 24,700 | 19,600 | 204 | 174 | 22 | 39 | 52 |
| Control | | 28,000 | 24,000 | 125 | 135 | 30 | 30 | 60 |

[1] Stretched 3× biaxially and heat-set at 150° C.
MD—machine or longitudinal direction.
TD—transverse direction.

Polyethylene terephthalate film suitable as a packaging material in the present process may be heat-shrinkable, and this type film is prepared by merely eliminating the heat-setting step from the process of preparing the oriented film. In other words, by stretching the film in one or two directions, preferably in both the MD and TD directions, the resulting film may be fabricated into a bag or other suitable container (which may or may not be perforated with a few small holes); and after filling the bag or container and closing it, the film will shrink tightly around the contents of the bag or container during the blanching step of the present packaging process. A heat-shrinkable film may be used to considerable advantage in packaging fruits or vegetables which retain their original shapes, e. g., corn on the cob, in order that subsequent packaging of the prepackaged produce in a master package, such as a cardboard box, is made easy. That is, by employing a heat-shrinkable wrapping film, excess film does not protrude out beyond the wrapped quantity of produce, and the neat prepackage is readily dropped into the master wrapping which may be in the form of a cardboard box or film overwrap. It should be emphasized that to provide for uniform shrinkage of the film around the produce the heat-shrinkable film must be perforated in order to provide for escape of air and other vapors from the package. The type of perforation, e. g., size and number and distribution of holes, will depend to a great extent upon the blanching conditions, type of produce and degree of shrinkage desired. Experience in cooking produce in perforated packages has indicated that the positive pressure created within the package serves to prevent water from entering the package. This is especially true when the perforations are small.

Under normal circumstances a balanced, non-heat-set (heat-shrinkable) film will shrink to a greater extent in the direction of last stretch. For example, if a film is stretched 3× in the MD and 3× in the TD, the extent of shrinkage in the TD will be greater. Hence, under practically all circumstances a balanced, heat-shrinkable film will shrink to different degrees in each direction. On the other hand, for certain types of packaging applications, depending upon the shape of the produce contained in a bag, a substantially equal degree of shrinkage in both directions may be desirable. Therefore, to obtain equal shrinkage in both directions it is necessary to stretch and/or roll the film to a lesser extent during the second orientation step whether it be stretching or rolling. For example, if a film is stretched 3× in the MD, it should be stretched to a lesser degree, e. g., about 2–2.5× in the TD, in order to obtain a film having substantially equal shrinkage in both directions.

In probably most of the useful applications of the present process it will be preferred to use oriented polyethylene terephthalate film having a thickness of from 0.25 mil to 2 mils. In this thickness range, fabricated bags are highly flexible and readily handled in standard bag-making and packaging equipment. One should not lose sight of the fact, however, that the more rigid oriented polyethylene terephthalate films having thicknesses from 2–10 mils and above may be highly useful in the present process for fabrication into substantially rigid containers which may be employed as the sole packaging medium for merchandising the frozen produce. In other words, these substantially rigid containers which may be fabricated in accordance with the processes described in either of copending applications U. S. Serial No. 360,849, filed June 10, 1953, in the name of R. C. Schilly, and U. S. Serial No. 435,143, filed June 8, 1954, in the name of C. B. Lundsager, may be fabricated from colored film bearing printed indicia, to present attractive packages for merchandising. In other words, these substantially rigid containers may be in the form of cylinders, flat dishes, tetrahedrons, squares, spheres, etc. In accordance with disclosure of application U. S. Serial No. 360,849, rigid containers suitable for purposes of this invention may be fabricated by applying suitable shaping pressure, by any desirable expedient, to oriented polyethylene terephthalate film to draw the film to the shape or form of container desired; subjecting the shaped film, while maintaining it under shaping pressure, to heat at a temperature at least as high as the highest temperature to which it will be subjected to in its intended use whereby to heat-set the film; and cooling the heat-set shaped film below the heat-setting temperature before removing the shaping pressure. Application Serial No. 435,143 discloses the fabrication of a strong rigid container of biaxially stretched, balanced heat-set polyethylene terephthalate film in the form of a tetrahedron. The tetrahedral structure may be fabricated from a flat sheet, which is formed into an open-ended cylinder or tube, or it may be fabricated from preformed tubing of balanced, heat-set polyethylene terephthalate film. In the first step, one end of the tubing is pinched together on a line transverse to the longitudinal axis of the tubing and suitably sealed. At this point, the produce to be packaged is introduced into the structure, and the open end of the tubing is then pinched together on a line transverse to the axis of the tubing and at right angles to the direction the first seal was made, and the contacting edges suitably sealed. The resulting closed structure is in the form of a tetrahedron.

In forming bags, which may either be substantially heat-stable or heat-shrinkable, or in preparing substantially rigid containers for use in the present process, the seals may be made by heat-sealing techniques or by using suitable adhesives which are either non-toxic or are used in such a way, in conjunction with particular types of seam seals, that there is no chance of their contacting the food products. Normally, heat-sealing the films together is most expedient and convenient. Oriented polyethylene terephthalate film may be heat-sealed with certain types of hot wire or hot knife heat-sealing apparatus, and the film may be heat-sealed by means of high frequency electric current (electronic sealing or dielectric heat-sealing).

There are a large number of standard adhesive compositions on the market satisfactory for sealing oriented polyethylene terephthalate films. These adhesives comprise or are derived from urea formaldehyde resins, phenol-formaldehyde resins, epoxide, resins, copolymers of butadiene and acrylonitrile, polyisobutylene, cyclized rubber, low melting polyamides and polysilicones. On the other hand, suitable adhesive compositions may be derived from a copolyester which may be made by reacting glycol, terephthalic acid, or an alkyl ester thereof, and sebacic acid or alkyl ester thereof to form compositions soluble in common organic solvents. These copolyester adhesives may be applied to the film surfaces from solvent solutions; the solvent is then evolved therefrom; and the surfaces are adhered together under heat and pressure. Other types of copolyester adhesive compositions may be prepared by reacting glycol, terephthalic acid or low alkyl ester thereof, and an acid or corresponding alkyl ester of such acids as isophthalic acid and hexahydro terephthalic acid under ester-interchange conditions, and thereafter subjecting the product of the ester-interchange to heat under reduced pressure to form the polyester as described in copending application U. S. Serial No. 462,099, filed October 13, 1954, in the name of C. E. Sroog.

For specific packaging problems in conjunction with employing the process of the present invention it may be necessary to employ a coated polyethylene terephthalate film that is one coated with a heat-sealable, moistureproof polymeric coating such as polymers containing at least 80% of vinylidene chloride.

The main advantage of the process of the present invention is the provision of the barrier packaging material between the fresh produce and water (in liquid or vapor form) which is absorbed by the produce and extracts flavorable and nutritious ingredients such as sugars, vitamins, and minerals from the produce being packaged. This barrier material, oriented polyethylene terephthalate film may be in the form of a thin, flexible film which may or may not be shrunken tightly about the produce in question, thereby acting substantially like a second skin for the produce, or the film, when employed in thicknesses greater than about 2–3 mils up to 10 mils and thicker, may be prefabricated into the form of substantially rigid heat-stable containers which may be filled with the washed produce prior to the blanching step of the present process. Regardless of the type of package employed, either a flexible bag or a rigid container, the frozen produce may be readily cooked in the same package by the ultimate consumer by simply immersing the bag or container in boiling water or a pressure cooker, or by placing the container in a hot oven to roast for a specified time required to heat the particular type of produce prior to opening the package for eating of the contents. It should be emphasized at this point that the present containers, after cooking, may be maintained in a heated condition for relatively long periods of time, 1 hour or more, prior to opening the package for ultimate consumption without encountering any loss of the initial ingredients of the fresh produce. In other words, the cooked produce may be maintained in the package on a conventional hot plate without producing the soggy, nutriment-starved mass normally resulting from maintaining cooked vegetables upon the conventional restaurant and hotel hot plates. The individual servings prepared in accordance with the present process may be employed to great advantage by restaurants, hotels, railroads, airlines, etc.

In the present process, the step of washing the freshly picked produce is normally carried out under conditions of reduced temperatures, and the washing step is normally effected rapidly by using cool water. The steps of the present invention should be carried out in rapid succession subsequent to picking the produce directly out of the fields or orchards. Subsequent to the initial washing step, the particular technique depending upon the specific type of produce, the fresh fruits or vegetables may require some cutting or slicing to subdivide them into the proper size for packaging. Thereafter, the cut or whole products may be individually packaged in available high speed packaging apparatus, and the required amount of product can be metered into bags or containers which may be continuously fabricated by particular packaging machinery. The individual packages may then be closed by heat-sealing or application of adhesives, and thereafter the packaged product is treated in the normal manner consisting of blanching, cooling, and freezing.

For example, corn on the cob is one vegetable that needs careful handling. It must be picked fresh because the milk in it will sour if the corn is allowed to stand around. The corn must be blanched to keep it from aging in the freezer, to keep the milk from souring, and to stop bacterial action. The following example serves to illustrate a single embodiment of the present invention as applied to packaging fresh corn on the cob, and this example is not to be construed as limiting the scope of the present process.

Sample ears of Stowell Evergreen and Golden Bantam were freshly picked and substantially immediately husked and washed in cold water at a temperature of about 20°–23° C. The ears of corn were then individually packaged in individual bags (3" x 6") of oriented (stretched 3× in both directions) heat-set (heat-set at about 200° C.) polyethylene terephthalate film (0.0005" in thickness). These bags were prepared by employing a hot wire sealing apparatus, the bags containing two longitudinal side seams and a transverse bottom seam seal. The ears of corn were placed into the bags and the bags were closed to the atmosphere by effecting a second transverse seam seal in the top of the bag by means of applying a hot flame to the superimposed open edges of the bag. The individual ears of corn in their respective packages were blanched in boiling water for an average time of about 9 minutes. Thereafter, the individual ears were immersed in chilled water until the ears were cold to the touch. Finally, the ears were substantially immediately quick-frozen and placed in a deep freeze. After a period of several days the individual packaged ears of corn were popped into boiling water and heated for a period of about 6–12 minutes. The sealed bag containing the individual ears were then opened by slitting the film, and after applying butter and salt to the corn, it was eaten. The flavor of the corn was compared to that of freshly picked and cooked corn on the cob of the same variety. Surprisingly, the samples processed by the present invention were superior in texture and sweetness.

While the foregoing example illustrates processing of one of the more difficult vegetable to handle, it should be understood that the same technique may be applied to packaging fresh produce, i. e., fresh fruits and such vegetables as peas, carrots, string beans, broccoli, brussels sprouts, cauliflower, spinach, etc., and such fresh fruits as strawberries, peaches, cherries, pineapples, etc.

The above example was repeated except that the oriented polyethylene terephthalate film used to form the bags was non-heat-set film, i. e., the film was heat shrinkable. Upon introducing the bags containing the ears of corn into boiling water for blanching the corn, the film immediately shrank tightly around the ears of corn to form a neat package. Larger bags, about 7" by 7" were also made to package two ears of corn, and the film shrank tightly around the ears of corn to form an attractive package which could be merchanized (in its frozen form) directly without a further overwrap or without inserting it into a cardboard box. After cooking, the sweetness and texture of the corn was substantially the same as that packaged in the oriented heat-set (non-shrinkable) polyethylene terephthalate film.

Although the process of the present invention relates to the packaging of fresh produce which is to be frozen and stored before shipping to the ultimate consumer, it should be mentioned at this point that the shrinkable and non-shrinkable oriented polyethylene terephthalate film may be advantageously employed for packaging fresh produce which is to be sent directly to the fresh produce market under cooling conditions (not frozen). In packaging such fresh produce the fresh fruit or vegetable is washed with cool water, inserted into perforated film bag (which may be shrinkable or non-shrinkable), immersed momentarily in a bath of hot water at about 90°–100° C. to shrink the film tightly around the produce (this is not done if the film is non-heat shrinkable), packed in an iced container and shipped to market. If the produce is to be cooked, e. g., corn on the cob, the entire package may be immersed in boiling water or put into a pressure cooker. After cooking, the package may be permitted to remain sealed until just before serving.

In cooking the produce directly in the package, particularly when the produce is frozen, the film acts as a thermal insulator. Therefore, the cooking time may have to be increased by 3–6 minutes. On the other hand, the time lag may be decreased by inserting a small amount of water into the package when the produce is packaged. This excess water vaporizes and helps to heat the produce uniformly.

I claim:

1. In the process of preserving fresh produce comprising the steps of successively washing, blanching, cooling and freezing the produce, the improvement which comprises enclosing the washed produce, prior to blanching, in a wrapper of oriented polyethylene terephthalate film to form a package of the produce, and thereafter blanching in a medium selected from the class consisting of hot water and steam, cooling, and freezing the packaged produce.

2. A process according to claim 1 wherein the film is biaxially oriented balanced polyethylene terephthalate film formed by stretching substantially amorphous polyethylene terephthalate film substantially equally in both directions from about 2 to 3.25 times its original linear dimensions.

3. A process according to claim 2 wherein the film is heat-set, biaxially oriented, balanced polyethylene terephthalate film.

4. A process according to claim 1 wherein the film is heat-shrinkable film.

5. A process according to claim 4 wherein the film is perforated to provide for the escape of air and vapors from the package during blanching.

(References on following page)

References Cited in the file of this patent

UNITED STATES PATENTS

| | | |
|---|---|---|
| 903,918 | Thrower | Nov. 17, 1908 |
| 2,048,447 | Hewitt | July 21, 1936 |
| 2,364,049 | Bensel | Dec. 5, 1944 |
| 2,376,583 | De Poix | May 22, 1945 |
| 2,452,174 | Arnold | Oct. 26, 1948 |
| 2,474,650 | Birdseye | June 28, 1949 |
| 2,497,376 | Swallow et al. | Feb. 14, 1950 |
| 2,538,002 | Irons et al. | Jan. 16, 1951 |
| 2,631,939 | Peters | Mar. 17, 1953 |